(12) United States Patent
Yoon et al.

(10) Patent No.: US 7,561,240 B2
(45) Date of Patent: Jul. 14, 2009

(54) COMMON ELECTRODE ON SUBSTRATE HAVING NON-DEPRESSED SURFACE PORTION OVERLAPPING OPENING IN PIXEL ELECTRODE ON OPPOSITE SUBSTRATE AND DEPRESSED PORTION PARTIALLY OVERLAPPING EDGE OF THE PIXEL ELECTRODE

(75) Inventors: Yea-Sun Yoon, Seoul (KR);
Seung-Beom Park, Kyung ki-do (KR);
Byoung-Sun Na, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/172,953

(22) Filed: Jul. 5, 2005

(65) Prior Publication Data

US 2005/0243248 A1    Nov. 3, 2005

Related U.S. Application Data

(63) Continuation of application No. 10/454,478, filed on Jun. 5, 2003, now Pat. No. 6,930,740, which is a continuation of application No. 09/727,782, filed on Dec. 4, 2000, now Pat. No. 6,593,982, which is a continuation-in-part of application No. 09/431,157, filed on Nov. 1, 1999, now Pat. No. 6,717,637.

(51) Int. Cl.
*G02F 1/1343* (2006.01)

(52) U.S. Cl. ..................... 349/144; 349/106

(58) Field of Classification Search .................. 349/38, 349/39, 106, 110, 111, 129, 139, 144
See application file for complete search history.

(56) References Cited

U.S. PATENT DOCUMENTS

| | | | |
|---|---|---|---|
| 5,309,264 A | 5/1994 | Lien et al. | 349/130 |
| 5,434,690 A | 7/1995 | Hisatake et al. | |
| 5,608,556 A | 3/1997 | Koma | 349/116 |
| 5,790,219 A | 8/1998 | Yamagishi et al. | 349/106 |
| 5,963,290 A | 10/1999 | Murai et al. | |
| 6,061,106 A | 5/2000 | Ahn et al. | 349/106 |
| 6,091,464 A * | 7/2000 | Song | 349/38 |
| 6,100,953 A | 8/2000 | Kim et al. | 349/122 |
| 6,259,503 B1 | 7/2001 | Watanabe et al. | 349/141 |
| 6,300,987 B1 * | 10/2001 | Jung | 349/39 |
| 6,342,938 B1 * | 1/2002 | Song et al. | 349/143 |
| 6,400,424 B1 * | 6/2002 | Kim et al. | 349/38 |

(Continued)

FOREIGN PATENT DOCUMENTS

JP    1-230025    *    9/1989

(Continued)

*Primary Examiner*—David Nelms
*Assistant Examiner*—John Heyman
(74) *Attorney, Agent, or Firm*—Haynes and Boone, LLP.

(57) ABSTRACT

A liquid crystal display includes a first substrate with pixel electrodes, and a second substrate with a common electrode facing the first substrate. The common electrode has depression patterns corresponding to the pixel electrodes. The side wall of each depression pattern is at an angle of 30-120° with respect to the first substrate. The depression patterns of the common electrode are formed through making depression patterns at color filters. In this structure, the liquid crystal display bears wide viewing angle and good picture quality.

10 Claims, 12 Drawing Sheets

U.S. PATENT DOCUMENTS

| | | | |
|---|---|---|---|
| 6,404,465 B1 * | 6/2002 | Nakayama et al. | 349/39 |
| 6,449,025 B2 | 9/2002 | Lee | 349/129 |
| 6,493,048 B1 * | 12/2002 | Baek et al. | 349/43 |
| 6,614,492 B1 | 9/2003 | Song | 349/38 |
| 6,654,090 B1 * | 11/2003 | Kim et al. | 349/129 |
| 6,717,637 B1 | 4/2004 | Yoon et al. | 349/106 |
| 6,791,647 B1 | 9/2004 | Kim et al. | 349/129 |
| 2005/0264722 A1 * | 12/2005 | Choi | 349/110 |

FOREIGN PATENT DOCUMENTS

| | | |
|---|---|---|
| JP | 2000-047217 | 2/2000 |
| JP | 2000-162599 | 6/2000 |

* cited by examiner

COMMON ELECTRODE ON SUBSTRATE HAVING NON-DEPRESSED SURFACE PORTION OVERLAPPING OPENING IN PIXEL ELECTRODE ON OPPOSITE SUBSTRATE AND DEPRESSED PORTION PARTIALLY OVERLAPPING EDGE OF THE PIXEL ELECTRODE

This application is a Continuation Application of U.S. patent application Ser. No. 10/454,478 filed on Jun. 5, 2003 and issued as U.S. Pat. No. 6,930,740, which is a Continuation Application of U.S. patent application Ser. No. 09/727,782 filed on Dec. 4, 2000 and issued as U.S. Pat. No. 6,593,982, which is a Continuation-In-Part Application of U.S. patent application Ser. No. 09/431,157 filed on Nov. 1,1999 and issued as U.S. Pat. No. 6,717,637, which claims priority to and the benefit of Korean Patent Application No. 1998-46153 filed on Oct. 30, 1998, which are all hereby incorporated by reference for all purposes as if fully set forth herein.

This application is filed as a continuation in part of pending U.S. patent application Ser. No. 09/431,157 filed Nov. 1, 1999, assigned to the same assignee.

BACKGROUND OF THE INVENTION (a) Field of the Invention

The present invention relates to a liquid crystal display and, more particularly, to a liquid crystal display which has a wide viewing angle.

(b) Description of the Related Art

Generally, liquid crystal displays have a structure where a liquid crystal is sandwiched between two substrates, and the electric field applied to the liquid crystal changes its arrangement to control light transmission.

Among them, the vertically aligned twisted nematic (VATN) liquid crystal displays have a pair of internal transparent substrates with transparent electrodes, a liquid crystal sandwiched between the substrates, and two polarizing plates externally attached to the substrates one by one. The liquid crystal molecules are initially aligned perpendicular to the substrates and, under the application of an electric field, they are spirally twisted with a predetermined pitch while being oriented to be parallel to the substrates.

When the polarizing plates are normal to each other in the polarizing direction, light is completely blocked when there is no application of an electric field. That is, in the so-called normally black mode, brightness is very low at an off state and hence the contrast ratio is high compared to the usual TN liquid crystal display. However, under the application of voltage (particularly gray scale voltage), a significant difference is present in retardation of light depending upon the viewing directions as in the usual TN liquid crystal display, so that the viewing angle becomes too narrow.

In order to solve such a problem, it has been proposed that the electrodes be patterned to generate fringe fields, and that the fringe fields generate several micro-regions with different orientation directions of the liquid crystal molecules. For instance, U.S. Pat. No. 5,309,264 issued to Lien discloses a technique of forming X-shaped opening portions at the common electrode. U.S. Pat. No. 5,434,690 issued to Histake et al. discloses a technique of forming opening portions at the electrodes of the top and bottom substrates in an alternate manner.

However, the above techniques require a separate mask to pattern the common electrode. Furthermore, since the color filter pigments may influence the liquid crystal, a protective layer must be formed on the color filters. It also generates serious textures at the periphery of the patterned electrodes.

SUMMARY OF THE INVENTION

It is an object of the present invention to provide a liquid crystal display which has a wide viewing angle with improved picture quality.

This and other objects may be achieved by a liquid crystal display having a color filter substrate and a thin film transistor array substrate.

The color filter substrate is overlaid with color filters with depression patterns, and a black matrix surrounding the color filters. A common electrode is formed on the color filters with the depression patterns to make partitioned orientations of the liquid crystal molecules.

The black matrix may be overlapped with the depression patterns of the color filters to reduce the light leakage.

The thin film transistor array substrate faces the color filter substrate with pixel electrodes. The pixel electrodes are provided with opening patterns. When the opening patterns of the pixel electrodes, and the depression patterns of the color filters proceed parallel to each in an alternate manner, stable orientations of the liquid crystal molecules and a wide viewing angle can be obtained.

When the common electrode is formed by depositing thin indium tin oxide onto the substrate twice, the common electrode at the periphery of the depression patterns can be prevented from being cut.

Furthermore, the common electrode also has depression patterns corresponding to those of the color filters, with the angle of the side wall of the depression pattern of the common electrode being 30-120° with respect to the thin film transistor array substrate.

Storage capacitor electrodes are further formed at the thin film transistor array substrate. When viewed from the top side, the pixel electrodes completely cover the storage capacitor electrodes at a predetermined region.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of this invention will be explained with reference to the accompanying drawings.

Figure 1A:
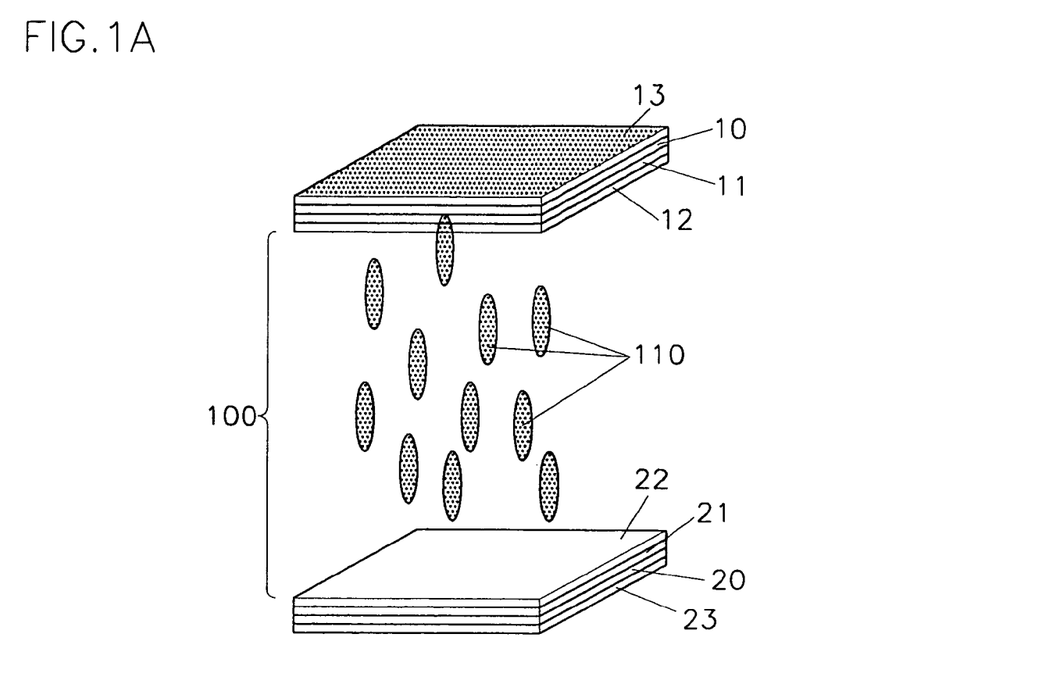
FIGS. 1A and 1B are schematic views illustrating the basic structure of a vertically aligned twisted nematic liquid crystal display according to the present invention in black and white modes.
Figure 1B:
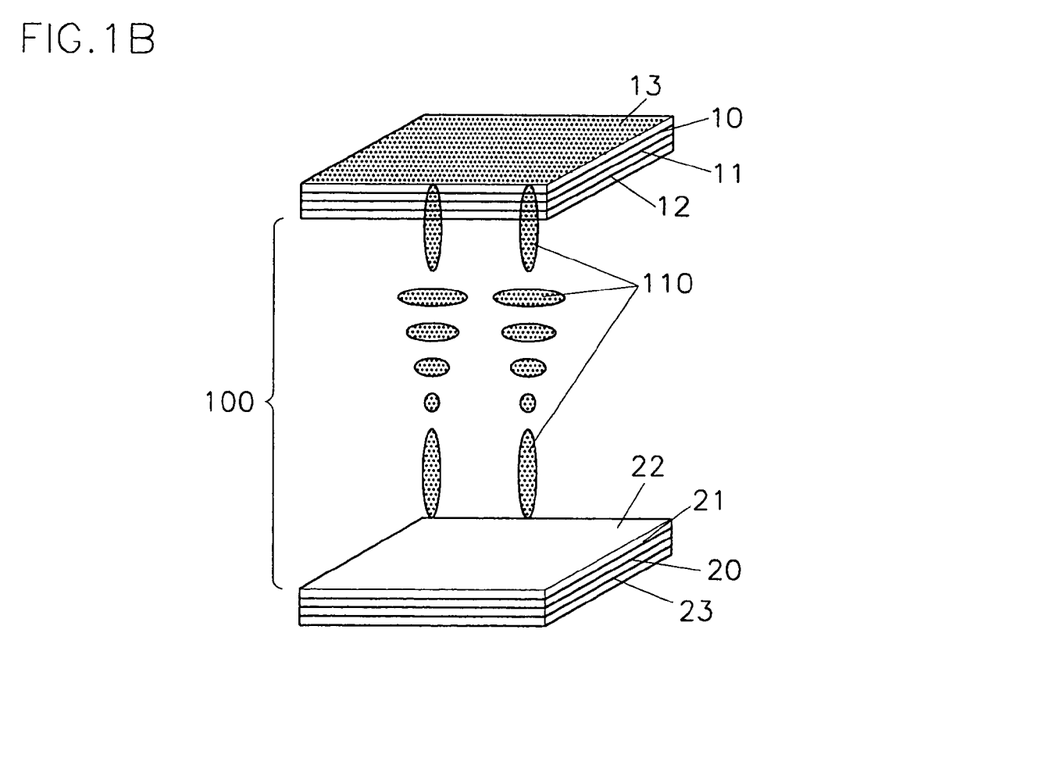

FIGS. 1A and 1B schematically illustrate the basic structure of a vertically aligned twisted nematic liquid crystal display according to the present invention when voltage is not applied to liquid crystal molecules and when voltage is applied thereto, respectively.

As shown in the drawings, the liquid crystal display includes two glass or quartz-based substrates 10 and 20 facing each other. Electrodes 11 and 21 based on a transparent conductive material such as indium tin oxide (ITO), and vertical alignment layers 12 and 22 are internally formed on the substrates 10 and 20 in a sequential manner. A liquid crystal layer 100 based on a liquid crystal material having a negative dielectric anisotropy is interposed between the alignment layers 12 and 22. The liquid crystal layer 100 may have chirality, or the alignment layers 12 and 22 may keep the layer 100 twisted. Polarizing plates 13 and 23 are externally attached to the substrates 10 and 20 to polarize the light passing through the liquid crystal layer 100 as well as the light incident upon the liquid crystal layer 100. The polarizing axes of the polarizing plates 13 and 23 are at an angle of 90° to each other.

As shown in FIG. 1A, the long axial directions (the so-called directors) of the liquid crystal molecules 110 are initially aligned to be perpendicular to the substrates 10 and 20 due to the alignment layers 12 and 22. In this state, the light linearly polarized through the polarizing plate 23 attached to the bottom substrate 20 passes through the liquid crystal layer 100 in a direct manner. Then, the light is intercepted by the polarizing plate 13 attached to the top substrate 10 so that the liquid crystal display comes to be in a black state.

When a potential difference is made at the electrodes 11 and 21 under the application of voltage, an electric field is formed such that the direction thereof is perpendicular to the substrate 10 and 20. Accordingly, the orientation directions of the liquid crystal molecules 110 are changed under the influence of the electric field.

As shown in FIG. 1B, when the electric field reaches a predetermined degree due to the large potential difference between the electrodes 11 and 21, the directors of the liquid crystal molecules 110 are oriented to be perpendicular to the direction of the electric field or parallel to the substrates 10 and 20 due to the dielectric anisotropy. But the liquid crystal molecules 110 positioned close to the alignment layers 12 and 22 are kept in the initial state because the alignment force of the alignment layers 12 and 22 exceeds the force of their dielectric anisotropy. Meanwhile, the liquid crystal molecules 110 are spirally twisted due to chirality. When the chirality is controlled in an appropriate manner, the directors of the liquid crystal molecules 110 can be rotated by 90° through the range from the bottom alignment layer 22 to the top alignment layer 12.

The light polarized through the polarizing plate 23 attached to the bottom substrate 20 passes through the liquid crystal layer 100 while being rotated by 90° at the polarizing axis thereof along the twisted directions of the directors, and passes by the polarizing plate 13 attached to the top substrate 10. Therefore, the liquid crystal display comes to be in a white state.

Figure 2:
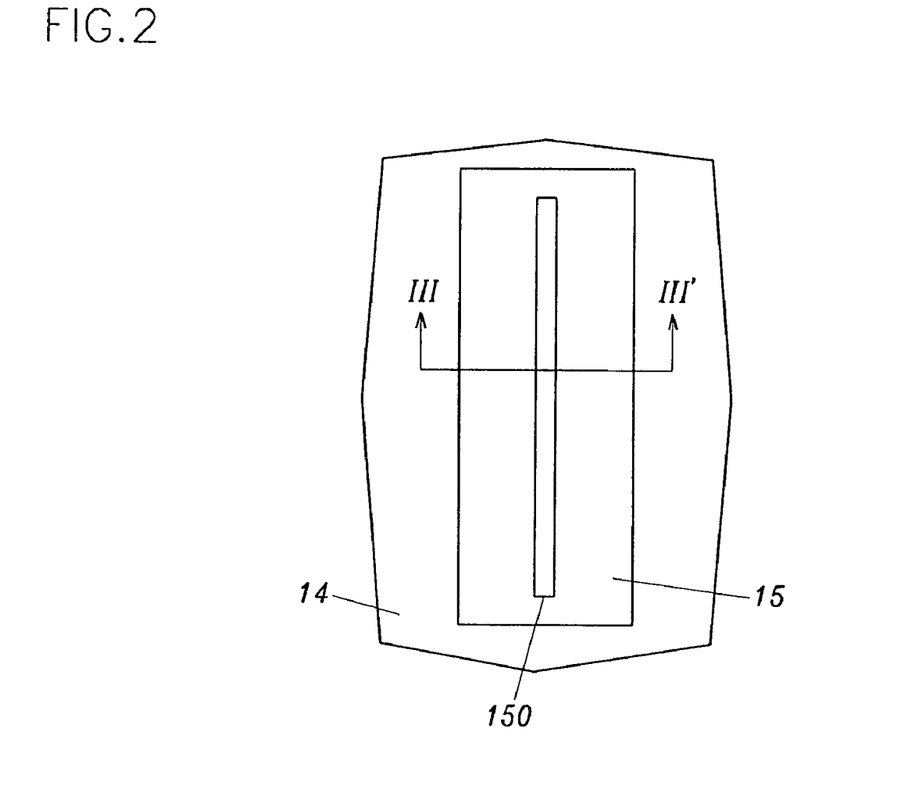
FIG. 2 is a plan view of a color filter substrate for a liquid crystal display according to a first preferred embodiment of the present invention.
Figure 3:
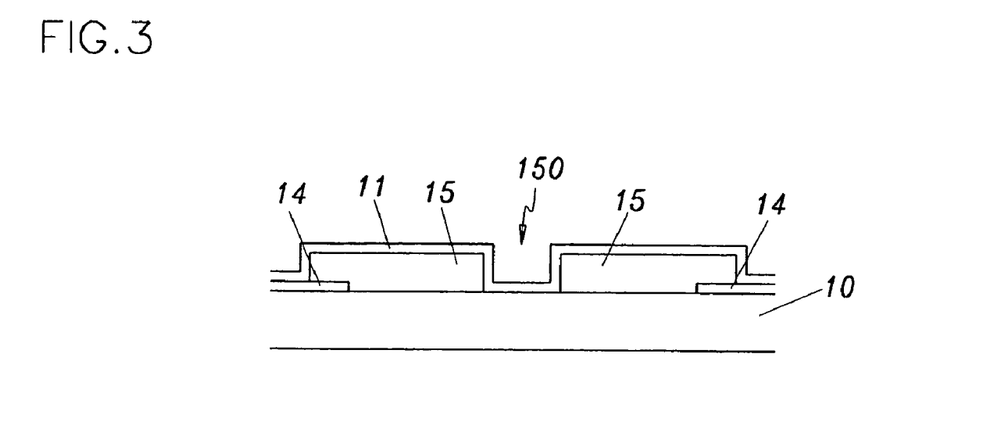
FIG. 3 is a cross sectional view of a color filter substrate taken along the III-III' line of FIG. 2.

FIG. 2 is a plan view of a color filter substrate for a liquid crystal display according to a first preferred embodiment of the present invention, and FIG. 3 is a cross sectional view of the color filter substrate taken along the III-III' line of FIG. 2.

As shown in the drawings, the color filter substrate 10 is overlaid with a black matrix 14 that defines pixel areas. The black matrix 14 is formed of metal such as chrome, or organic black resist. Color filters 15 of red, green and blue are formed at the pixel areas defined by the black matrix 14. Each color filter 15 has a longitudinal depressed portion 150 centrally proceeding in the vertical direction. A common electrode 11 is formed on the black matrix 14 and the color filters 15 of a transparent conductive material such as ITO.

In the fabrication process, a black matrix is first formed on a substrate through depositing metal such as chrome or black resist thereon, and patterning it.

Thereafter, a resist of red, green or blue is deposited onto the substrate, and patterned to form color filters with depressed portions.

Finally, a transparent conductive material such as ITO is deposited onto the black matrix and the color filters to form a common electrode. Since the common electrode is easily cut and disconnected due to the stepped area on the depressed portion of the color filters, it is preferable to form the common electrode by depositing the conductive material twice, each time with a slight thickness.

The liquid crystal molecules 110 are initially kept perpendicular to the substrates 10 and 20 so that the liquid crystal display is in a black state as with the non-patterned color filters.

Figure 4:
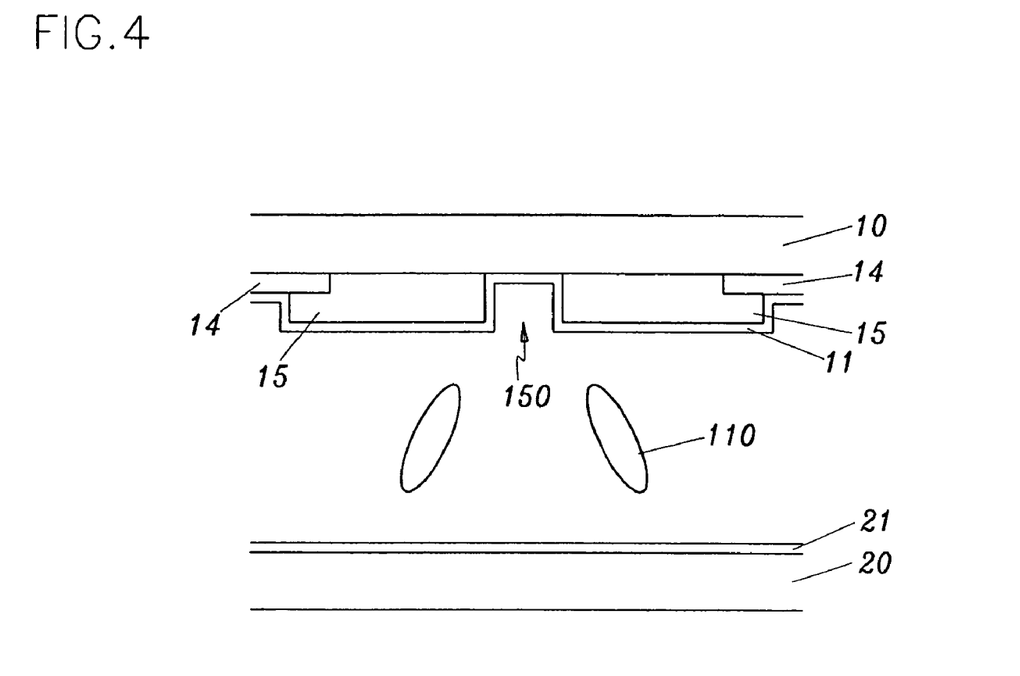
FIG. 4 is a cross sectional view of a liquid crystal display with the color filter substrate shown in FIG. 2.

When voltage is applied, as shown in FIG. 4, electric fields in most places are perpendicular to the substrates 10 and 20, but the electric field close to the depressed portion 150 of the color filter 15 has curved equipotential lines.

As the liquid crystal has a negative dielectric anisotropy, the orientation directions of the liquid crystal molecules 110 tend to be perpendicular to the direction of the electric field. Therefore, the directors of the liquid crystal molecules close to the depressed portion 150 of the color filter 15 are twisted while being inclined with respect to the substrates 10 and 20. In this way, two micro-regions where the inclined directions of the liquid crystal molecules 110 are opposite to each other around the center line of the depressed portion 150 of the color filter 15 are present, and optical characteristics at the two regions compensate for each other, resulting in a wide viewing angle.

The technique of forming depressed portions at the color filters 15 to realize partitioned orientation of the liquid crystal molecules 110 may be easily performed compared to other techniques such as rubbing, and can control the micro-regions very much in detail while varying the shape of the depressed portions.

The depressed portion of the color filter 15 may have a depth identical with the thickness of the color filter 15, or smaller than the thickness of the color filter 15.

Figure 5:
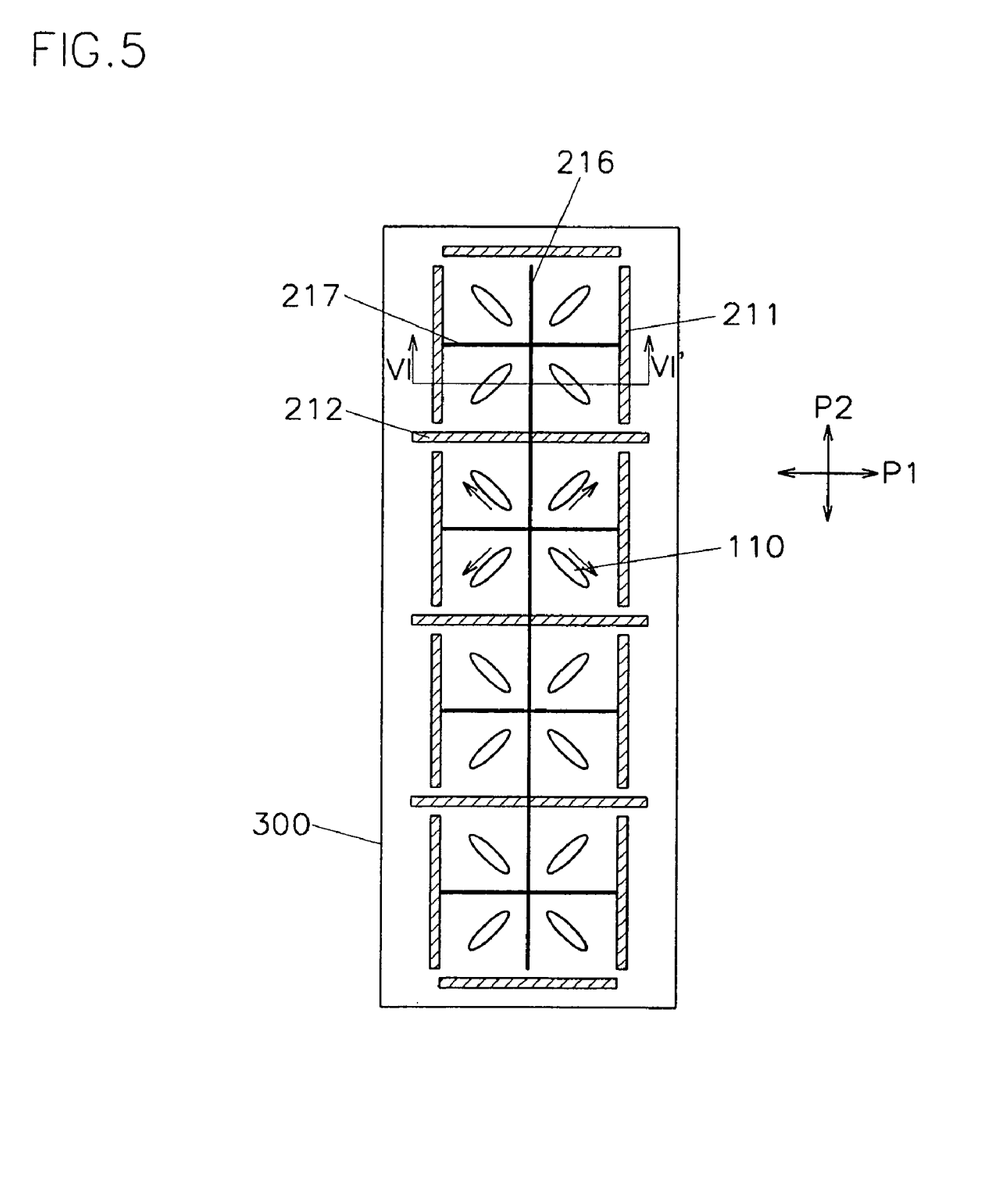
FIG. 5 is a plan view of a liquid crystal display according to a second preferred embodiment of the present invention.
Figure 6:
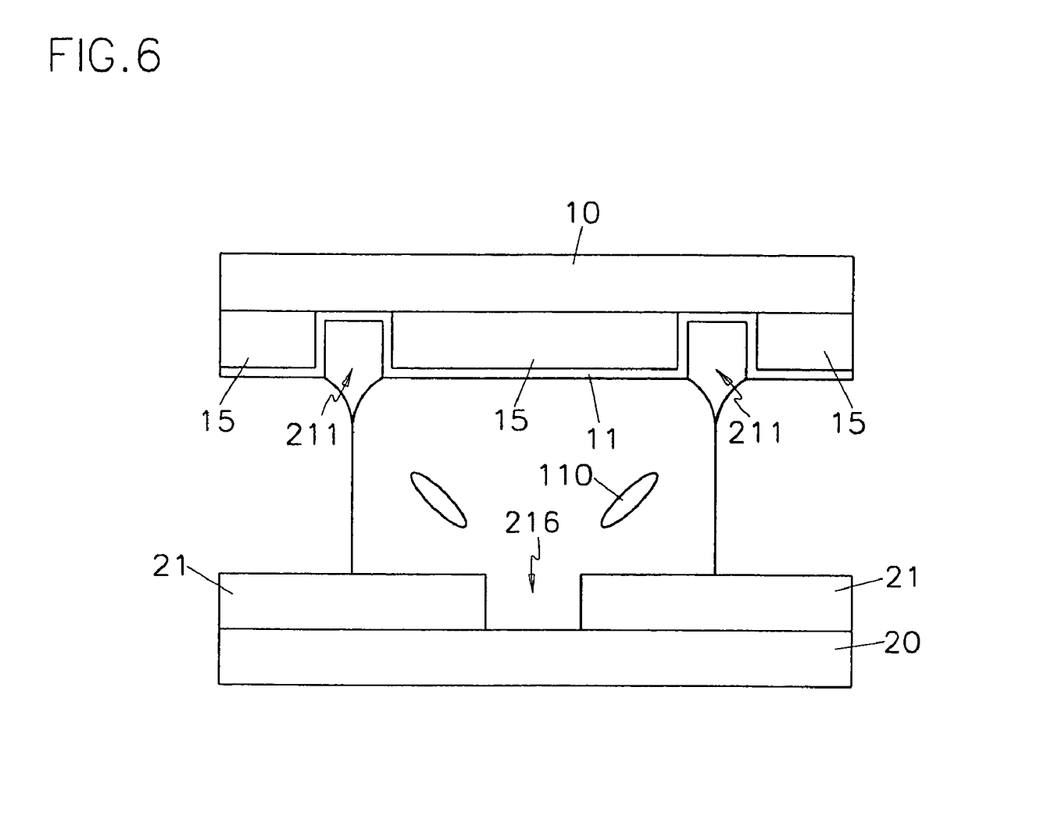
FIG. 6 is a cross sectional view of the liquid crystal display taken along the VI-VI' line of FIG. 5.

FIG. 5 is a plan view of a liquid crystal display according to a second preferred embodiment of the present invention where one pixel area is illustrated, and FIG. 6 is a cross sectional view of the liquid crystal display taken along the VI-VI' line of FIG. 5. In this preferred embodiment, the depressed patterns of the color filters 15 are exemplified as the opening patterns where the color filters 15 are completely removed. Of course, it is possible that the color filters 15 are only partially removed to form the depressed patterns.

As shown in the drawings, a plurality of linear opening portions are present at one pixel area 300. That is, first and second linear opening portions 211 and 212 are formed at the color filter 15 of the top substrate 10 while proceeding in the vertical and horizontal directions, and third and fourth linear opening portions 216 and 217 are formed at the electrode 21 of the bottom substrate 20 while proceeding in the vertical and horizontal directions.

The first and second opening portions 211 and 212 formed at the top substrate 10 are separated from each other, and arranged in the vertical direction while roughly forming four squares.

The third opening portion 216 formed at the bottom substrate 20 centrally proceeds at the pixel area 300 in the vertical direction while vertically bisecting the four squares formed by the first and second opening portions 211 and 212. Both ends of the third opening portion 216 nearly reach the second opening portions 212. In contrast, the fourth opening portions 217 proceed at the pixel area 300 in the horizontal direction while horizontally bisecting the corresponding square formed by the first and second opening portions 211. Both ends of the fourth opening portions 217 nearly reach the first opening portions 211.

Therefore, the opening portions 211, 212, 216 and 217 at the two substrates 10 and 20 together form square-shaped micro-regions where the first and second opening portions 211 and 212 form the neighboring sides, and the third and fourth opening portions 216 and 217 form the remaining neighboring sides.

In the above structure, as shown in FIG. 6, the liquid crystal molecules 110 are inclined due to the fringe fields close to the opening portions. The fringe fields close to the first and third opening portions 211 and 216 direct the liquid crystal molecules toward the first opening portions 211 from the third opening portion 216. Therefore, the orientation directions of the liquid crystal molecules are differentiated while taking the opening portions 211 and 216 as the boundary.

Since the neighboring opening portions defining the square-shaped micro-region are perpendicular to each other, the directors of the liquid crystal molecules within the micro-region vary in position. As indicated by arrows in FIG. 5, the directors of the liquid crystal molecules are directed in four average directions while proceeding toward the angular points of the square-shaped micro-regions from the center thereof.

In this way, sixteen square-shaped micro-regions are formed at one pixel area, and the directors of the liquid crystal molecules within each micro-region are directed in one of the four average directions. The directors of the liquid crystal molecules in the neighboring micro-regions are at an angle of 90° to each other when viewed from the top side.

Furthermore, when the polarizing axes P1 and P2 of the polarizing plates are established to be perpendicular to each other in the horizontal and vertical directions, the directors of the liquid crystal molecules within each micro-region are at an angle of 45° with respect to the polarizing axes P1 and P2 of the polarizing plates when voltage is applied.

Figure 7:
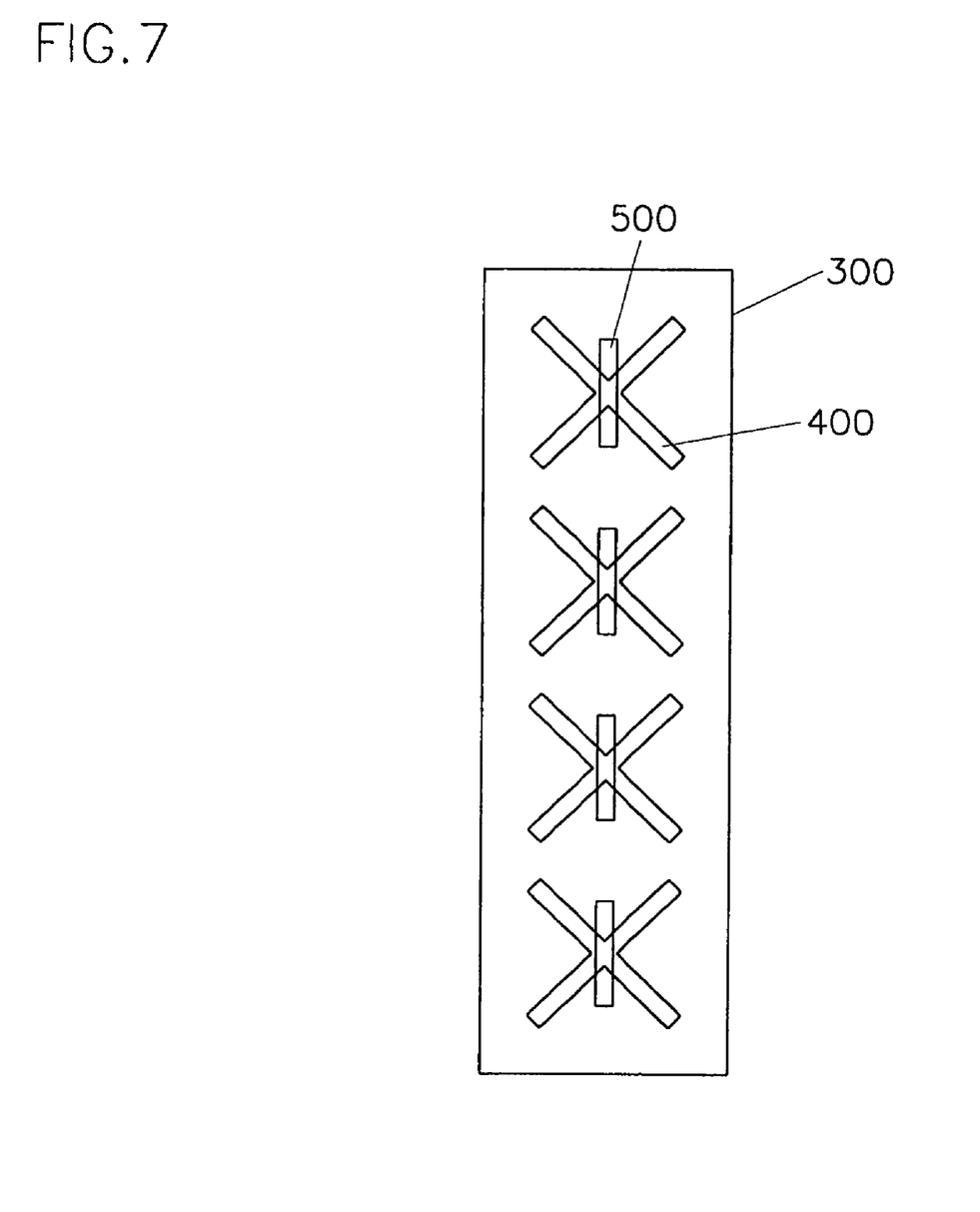
FIG. 7 is a plan view of a liquid crystal display according to a third preferred embodiment of the present invention.

FIG. 7 is a plan view of a liquid crystal display according to a third preferred embodiment of the present invention.

As shown in FIG. 7, a plurality of X-shaped opening portions 400 are formed at each pixel electrode of the bottom substrate while proceeding in the vertical direction, and linear opening portions 500 are formed at the corresponding color filter while each crosses the center of the X-shaped opening portions 400.

Of course, the shape of depression patterns including opening patterns formed at the top and bottom substrates may change in various manners.

Figure 8:
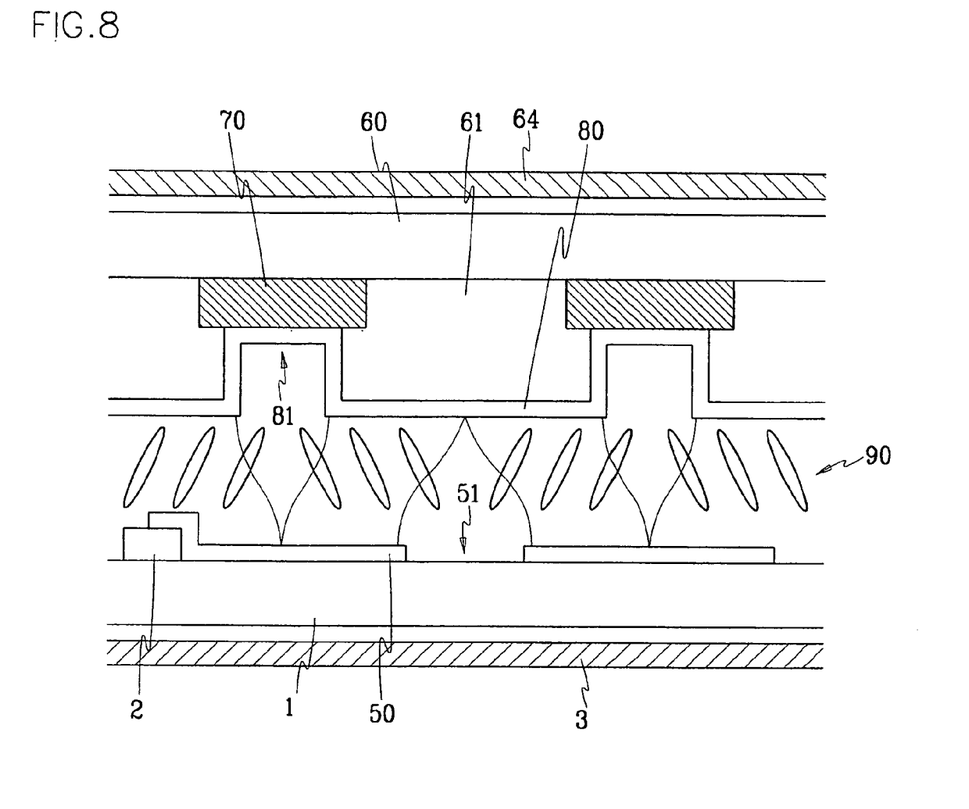
FIG. 8 is a cross sectional view of a liquid crystal display according to a fourth preferred embodiment of the present invention.

FIG. 8 is a cross sectional view of a liquid crystal display according to a fourth preferred embodiment of the present invention.

As shown in FIG. 8, the liquid crystal display includes a bottom substrate 1, a top substrate 60, and a liquid crystal 90 sandwiched between the bottom and top substrates 1 and 60. The bottom and top substrates 1 and 60 are formed with a transparent insulating material such as glass.

Pixel electrodes 50 are formed on the bottom substrate 1 with a transparent conductive material such as indium tin oxide (ITO) and indium zinc oxide (IZO) with each having an opening pattern 51. The pixel electrode 50 is connected to a switching circuit 2 to receive picture image signal voltage. A thin film transistor (TFT) is used as the switching circuit 2. The TFT is connected to a gate line (not shown) for transmitting scanning signals thereto and a data line (not shown) for transmitting picture image signals thereto. The pixel electrode 50 turns on or off according to the scanning signal. A bottom polarizing plate 3 is externally attached to the bottom substrate 1. In the case of reflection type liquid crystal displays, the pixel electrode 50 may be formed with a non-transparent material, and the bottom polarizing plate 3 may not be necessary.

The top substrate 60 facing the bottom substrate 1 is sequentially overlaid with a black matrix 70 surrounding color filters 61, and a common electrode 80. The common electrode 80 is formed with a transparent conductive material such as ITO or IZO.

Each color filter 61 is provided with a depression pattern, and the common electrode 80 formed on the color filters 61 has depression patterns 81 corresponding to those of the color filters 61.

The black matrix 70 surrounding the color filters 61 is also formed under the depression patterns 81 of the common electrode 80 to prevent light leakage caused by the depression patterns 81.

The black matrix 70 is usually formed with a conductive material such as chrome, but may be formed with an organic material. When the black matrix 70 is formed with a conductive material, it also functions as a conduction passage for passing a signal for the common electrode 80, thereby reducing resistance of the common electrode 80.

The above structure can have wide viewing angle characteristics for the following reasons.

When voltage is not applied to the display device, the liquid crystal molecules 90 are kept aligned perpendicular to the substrates 1 and 60 while being in a black state, as with the non-patterned common electrode.

When voltage is applied, as shown in FIG. 8, an electric field is formed normal to the substrates 1 and 60 in most places, but formed in a curved shape along the depression pattern of the common electrode 80. Therefore, the equipotential lines between the substrates 1 and 60 are not parallel thereto, but curved in accordance with the shape of the common electrode 80. Consequently, the electric field does not also proceed normal to the substrates 1 and 60, but is slightly inclined.

As the liquid crystal has a negative dielectric anisotropy, the orientation directions of the liquid crystal molecules tend to be normal to the direction of the electric field. Therefore, the long axes of the liquid crystal molecules close to the depression pattern 81 are twisted and inclined with respect to the substrates 1 and 60. In this way, two regions where the inclined directions of the liquid crystal molecules are opposite to each other are divided around the center line of the depression pattern 81 so that the optical characteristics at the two regions compensate for each other, resulting in a wide viewing angle.

The relation between the shape of the depression pattern and the picture quality will be now described.

Figure 9A:
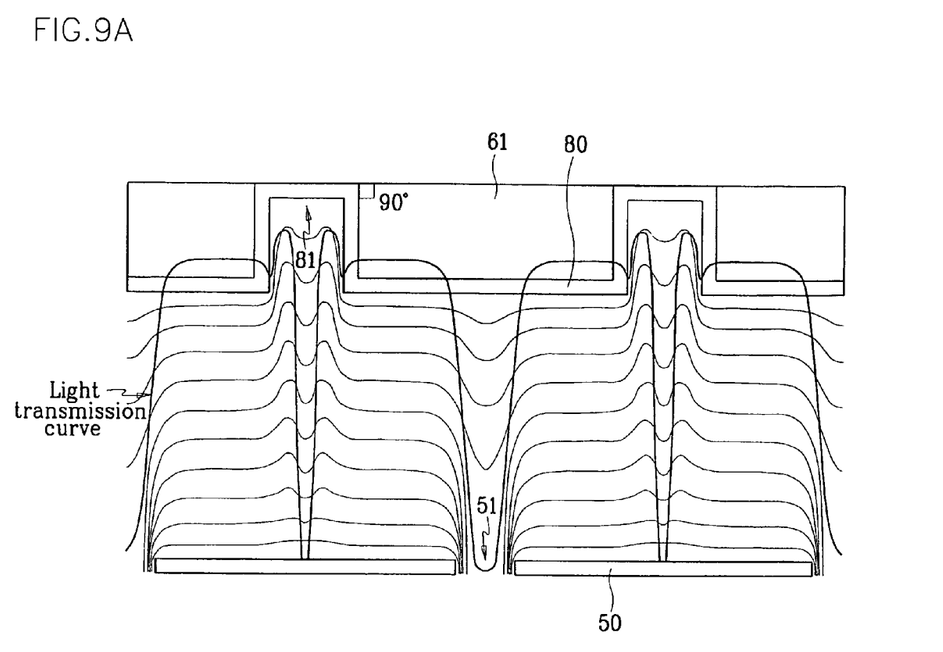
FIGS. 9A and 9B are amplified views of the liquid crystal display shown in FIG. 8 illustrating equipotential lines and light transmission curves when a side wall of a depression pattern is at an angle of 90° or 45° with respect to a substrate.
Figure 9B:
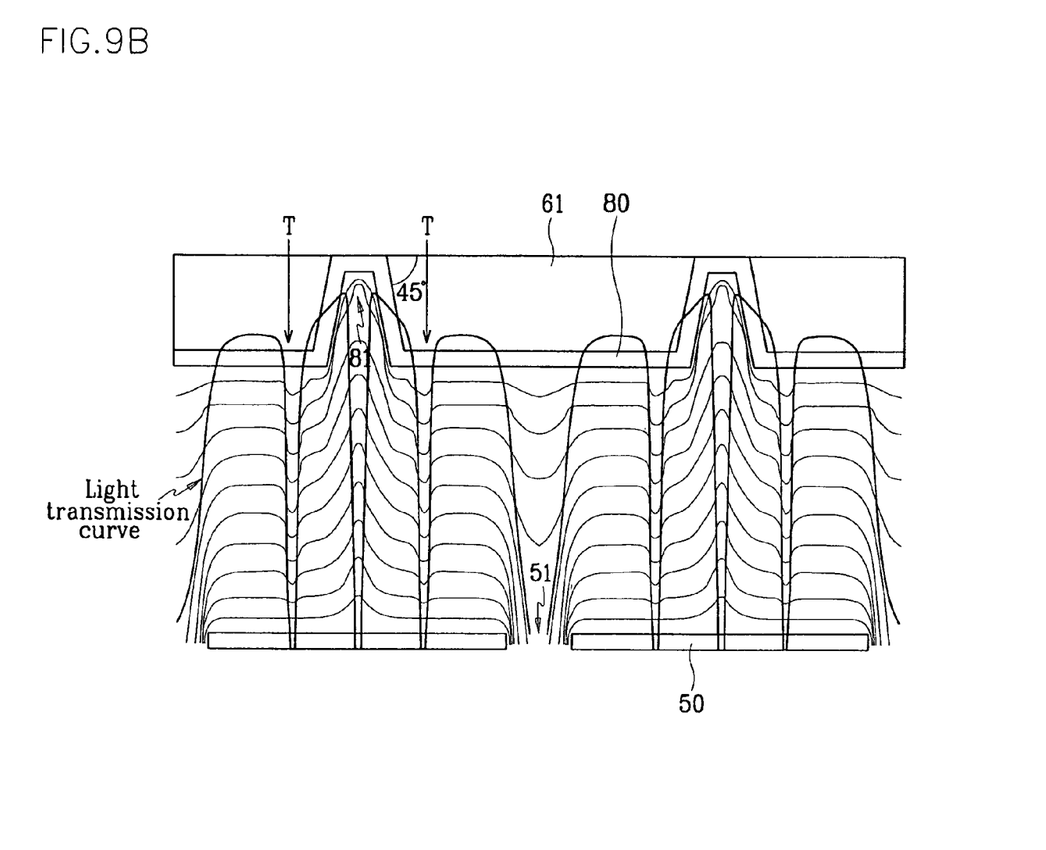

FIGS. 9A and 9B illustrate equipotential lines and light transmission curves where the side wall of the depression pattern is at an angle of 90° or 45° with respect to the substrate.

When the angle between the side wall of the depression pattern and the substrate is 90°, as shown in FIG. 9A, the equipotential lines are curved a lot at the bottom of the depression pattern of the common electrode 80 and at the top of the opening pattern of the pixel electrode 50. Since the light transmission varies radically only at the depression pattern and the opening pattern, textures are not shown if the depression pattern is covered. However, when the angle between the side wall of the depression pattern and the opening pattern is 45°, as shown in FIG. 2B, the equipotential lines become radically curved not only at the bottom of the depression pattern of the common electrode 80 and at the top of the opening pattern of the pixel electrode 50, but also at the peripheral area of the depression pattern. The light transmission also varies radically at the depression pattern and the opening pattern as well as at the peripheral area of the depression pattern. Therefore, textures are generated at the peripheral area of the depression pattern.

As shown above, the smaller angle between the side wall of the depression pattern and the substrate generates more widely spread textures around the peripheral area of the depression pattern. Therefore, it is preferable that the angle between the side wall of the depression pattern and the substrate becomes great when measured from the side of the color filters 61. That angle is preferably 90° or more. However, when such an angle is 120° or more, the ITO-based common electrode is easy to be cut and disconnected at the depression pattern.

When the angle between the side wall of the depression pattern and the substrate is 45°, as shown in FIG. 9B, textures are generated at the peripheral area of the depression pattern. Nevertheless, they do not deteriorate the picture quality in a serious manner. Furthermore, the degree of textures can be controlled through varying the width of the depression pattern or the width of the opening pattern of the pixel electrode. Therefore, the lowest angle between the side wall of the depression pattern and the substrate is about 30°.

Figure 10:
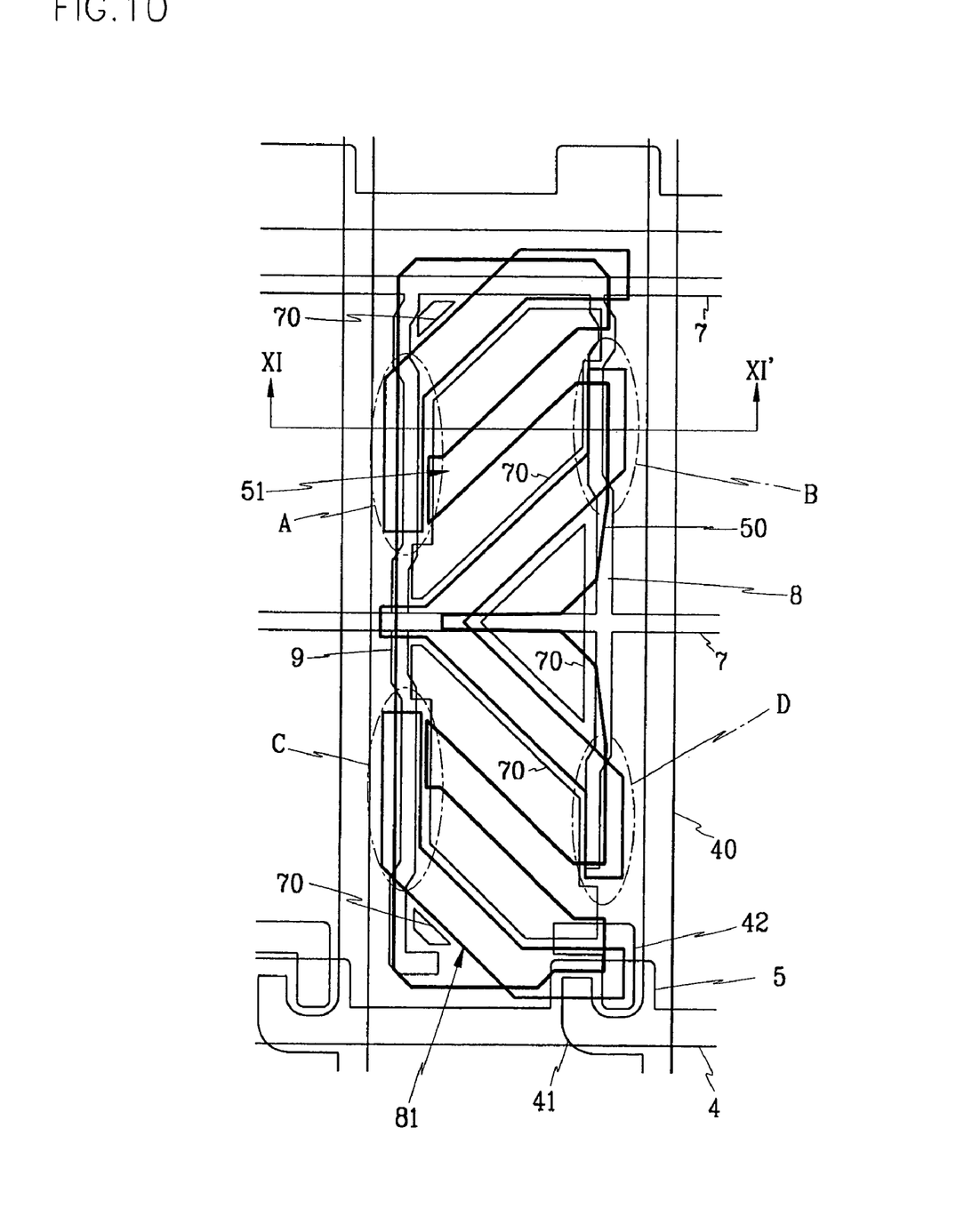
FIG. 10 is a plan view of a liquid crystal display according to a fifth preferred embodiment of the present invention.
Figure 11:
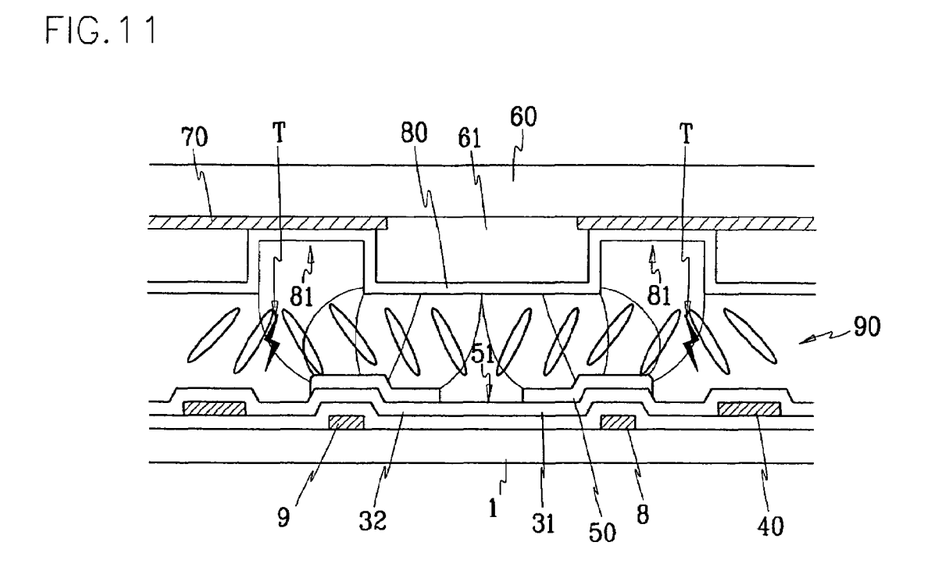
FIG. 11 is a cross sectional view of the liquid crystal display taken along the XI-XI' line of FIG. 10.
Figure 12:
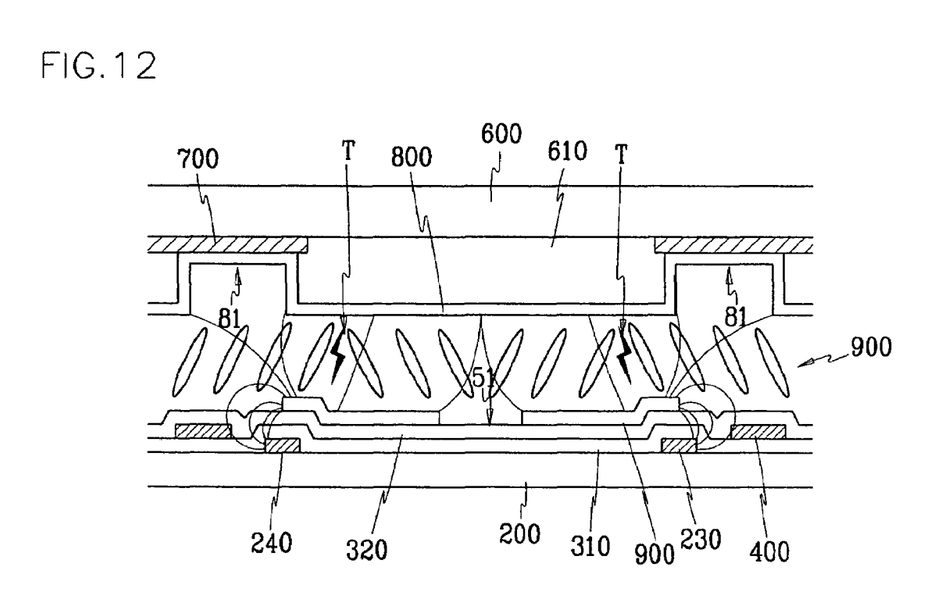
FIG. 12 is a cross sectional view of a liquid crystal display for comparison with the liquid crystal display shown in FIG. 11.

FIG. 10 is a plan view of a liquid crystal display according to a fifth preferred embodiment of the present invention, FIG. 11 is a cross sectional view of the liquid crystal display taken along the XI-XI' line of FIG. 10, and FIG. 12 is a cross sectional view of a liquid crystal display for comparing with the liquid crystal display shown in FIG. 11.

Gate lines 4 are formed on a bottom insulating substrate 1 with gate electrodes 5 while proceeding in the horizontal direction. Common electrode lines 6 and 7 are formed on the bottom substrate 1 while proceeding parallel to the gate lines 4. The common electrode lines 6 and 7 are connected to each other via two storage capacitor electrodes 8 and 9 proceeding in the vertical direction. The number of common electrode lines 6 and 7 may be one, three or more. The gate lines 4, the gate electrodes 5, the common electrode lines 6 and 7, and the storage capacitor electrodes 8 and 9 may be formed with a metallic material such as aluminum or chrome while having a single-layered structure, or a double-layered structure formed sequentially with a chrome-based layer and an aluminum-based layer.

A silicon nitride-based gate insulating layer 31 is formed on the gate lines 4, the common electrode lines 6 and 7, and the storage capacitor electrodes 8 and 9.

Data lines 40 are formed on the gate insulating layer 31 in the vertical direction. Source electrodes 41 are branched from the data lines 40, and drain electrodes 42 are positioned close to the source electrodes 41 while being separated from them. The data lines 40, the source electrodes 41, and the drain electrodes 42 are formed with a metallic material such as chrome or aluminum, in a single or multiple-layered structure.

A semiconductor layer (not shown) for forming TFT channels, and an ohmic contact layer (not shown) for reducing contact resistance between the semiconductor layer and the source and drain electrodes 41 and 42 are formed under the source and drain electrodes 41 and 42. The semiconductor layer is usually formed with amorphous silicon, and the ohmic contact layer is formed with amorphous silicon doped with n-type impurities of high concentration.

A protective layer 32 is formed on the data lines 40 of an inorganic insulating material such as silicon nitride or an organic insulating material such as resin. The protective layer 32 is provided with contact holes (not shown) opening the drain electrodes 42.

Pixel electrodes 50 are formed on the protective layer 32 with opening patterns 51. The pixel electrodes 50 are formed with a transparent conductive material such as indium tin oxide (ITO) or indium zinc oxide (IZO), or an opaque conductive material such as aluminum that exhibits a good light reflection property.

The opening pattern 51 of each pixel electrode 50 has a horizontal opening portion formed at the boundary of the pixel electrode 50 bisecting it into upper and lower regions, and inclined opening portions formed at the upper and lower regions of the pixel electrode 50 while proceeding perpendicular to each other, thereby uniformly distributing fringe fields in all directions.

The storage capacitor electrodes 8 and 9 are completely covered by the pixel electrode 50 at the A, B, C and D regions when viewed from the top side.

A black matrix 70 is formed at the top insulating substrate 60 to prevent leakage of light. Color filters 61 are formed on the top substrate 60 with depression patterns. A common electrode 80 is formed on the color filters 61 with depression patterns 81 corresponding to those of the color filters 61. The depression patterns 81 of the common electrode 80 are formed due to the corresponding depression patterns of the color filters 61. The common electrode 80 is formed with a transparent conductive material such as ITO or IZO.

The depression pattern 81 of the common electrode 80 at a pixel area has inclined depressed portions that externally proceed parallel to the upper and lower inclined opening portions of the pixel electrode 50, and linear depressed portions bent from the inclined depressed portions while being overlapped with the sides of the pixel electrode 50. The linear depressed portions are classified into horizontal and vertical linear depressed portions. The sides of the pixel electrode 50 overlapping the vertical linear depressed portions completely cover the underlying storage capacitor electrodes 8 and 9.

In the above-structured liquid crystal display, textures can be effectively prevented in the following respects.

FIG. 12 illustrates a liquid crystal display bearing occurrence of textures. As shown in FIG. 12, when voltage is applied to a common electrode 800 and a pixel electrode 900, a strong electric field is formed between storage capacitor electrodes 230 and 240 and the periphery of the pixel electrode 900. The strong electric field influences the electric field formed at the periphery of the pixel area. Particularly, such an influence becomes prominent at the A, B, C and D regions where the common electrode 800 is provided with depression patterns 81. For that reason, the fringe field formed at the periphery of the pixel area is inclined in a direction opposite to the direction of the fringe field formed at the center of the pixel area. Therefore, the orientation directions of the liquid crystal molecules are reverse-turned at the region T between the periphery and the center of the pixel area. Such a region T is displayed on the screen as a texture.

By contrast, in the liquid crystal display shown in FIG. 11, the pixel electrode 50 completely covers the storage capacitor electrodes 8 and 9. Therefore, most of the electric lines of force formed between the pixel electrode 50 and the storage capacitor electrodes 8 and 9 are connected to the bottom surface of the pixel electrode 50. Consequently, the electric field between the pixel electrode 50 and the storage capacitor electrodes 8 and 9 does not influence the liquid crystal molecules. The fringe fields that are not influenced by the storage capacitor electrodes 8 and 9 are kept in the predetermined direction within the pixel area, and varied in direction out of the pixel area (while being covered by the black matrix). As the region T where the orientation directions of the liquid crystal molecules are reverse-turned comes into being out of the pixel area while being covered by the black matrix, textures are not displayed at the screen.

Figure 13:
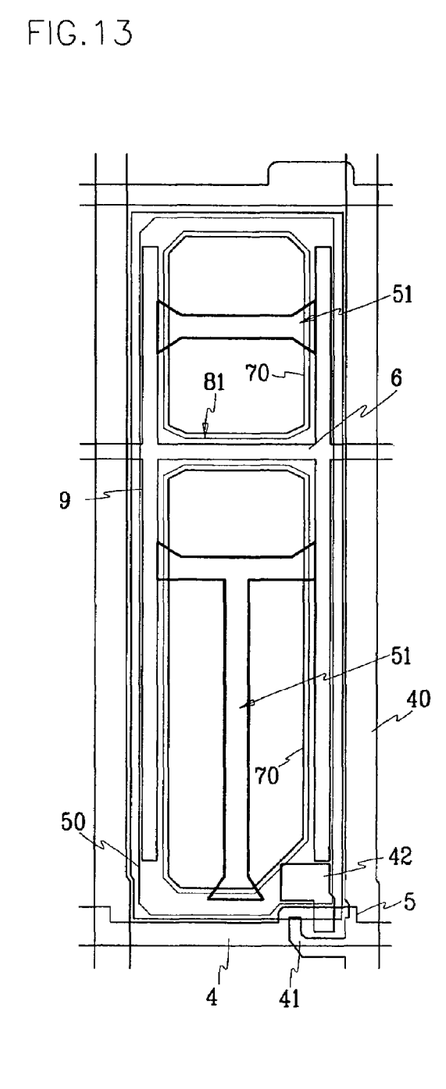
FIG. 13 is a plan view of a liquid crystal display according to a sixth preferred embodiment of the present invention.

FIG. 13 is a plan view of a liquid crystal display according to a sixth preferred embodiment of the present invention. In this preferred embodiment, other components and structures of the liquid crystal display are the same as those related to the fifth preferred embodiment except that the opening patterns 51 of the pixel electrodes 50, the depression patterns 81 of the common electrode 80, the storage capacitor electrodes 9, and the common electrode lines 6 have a different structure.

The opening pattern 51 of each pixel electrode 50 is formed with horizontal opening portions and vertical opening portions. The depression pattern 81 of the common electrode 80 corresponding to the opening pattern 51 of the pixel electrode is formed with a peripheral depressed portion overlapped with the periphery of the pixel electrode 50, and a horizontal depressed portion placed between the horizontal opening portions of the pixel electrode 50.

The opening pattern 51 and the depression pattern 81 are overlapped with each other to thereby divide the pixel area into several micro-regions. Each micro-region is shaped as a polygon having two longer sides that are parallel to each other. Such a structure makes the response speed of the liquid crystal molecules fast. That is, the fringe field formed by the opening pattern 51 and the depression pattern 81 makes the liquid crystal molecules to be oriented parallel to each other. In this way, the liquid crystal molecules moves in one step and reduces the response time.

In the previous fifth preferred embodiment, the micro-regions divided by the opening pattern and the depression pattern are also shaped as a polygon where the two longest sides thereof are parallel to each other.

The common electrode line 6 proceeds in the horizontal direction by one per each pixel area, but may be formed in plurality. The common electrode line 6 is overlapped with the horizontal depressed portion of the depression pattern 81. The storage capacitor electrode 9 proceeds parallel to the left and right sides of the pixel electrode 50 while being covered by the pixel electrode 50. This structure is to prevent textures.

Figure 14:
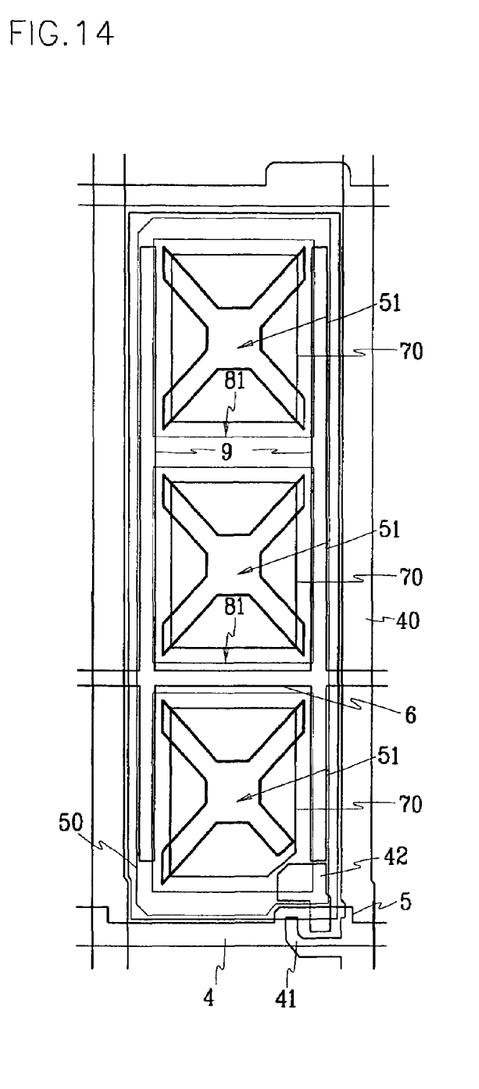
FIG. 14 is a plan view of a liquid crystal display according to a seventh preferred embodiment of the present invention.

FIG. 14 is a plan view of a liquid crystal display according to a seventh preferred embodiment of the present invention. In this preferred embodiment, other components and structures of the liquid crystal display are the same as those related to the fifth preferred embodiment except that the opening patterns 51 of the pixel electrodes 50, the depression patterns 81 of the common electrode 80, the storage capacitor electrodes 9, and the common electrode lines 6 have a different structure.

The opening pattern 51 of each pixel electrode 50 is formed with a plurality of X-shaped opening portions. The depression pattern 81 is formed with a peripheral depressed portion and horizontal depressed portions while isolating the X-shaped opening portions from each other.

The common electrode line 6 proceeds in the horizontal direction with one for each pixel area, but it may be formed in a plural manner. The common electrode line 6 is overlapped with one of the horizontal depressed portions of the depression pattern 81. The storage capacitor electrodes 9 proceed parallel to the left and right sides of the pixel electrode 50 while being covered by the pixel electrode 50.

As described above, the inventive liquid crystal display involves a wide viewing angle, rapid response speed, and excellent picture quality.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display (LCD), comprising:
a first substrate;
a pixel electrode formed on the first substrate and having an opening pattern;
a storage electrode formed on the first substrate;
a second substrate facing the first substrate; and
a common electrode formed on the second substrate and having a non-flat continuous surface including a depressed portion and a non-depressed portion;
wherein a non-depressed portion of the common electrode completely overlaps an opening of the pixel electrode and the depressed portion adjacent to the non-depressed portion of the common electrode at least partially overlaps an edge of the pixel electrode; and
further wherein the pixel electrode covers a portion of the storage electrode in a width direction.

2. The LCD of claim 1, further comprising a color filter formed on the second substrate and having a depressed portion.

3. The LCD of claim 2, further comprising a black matrix formed on the second substrate.

4. The LCD of claim 3, wherein the black matrix has a portion overlapped with the depressed portion.

5. The LCD of claim 2, wherein the depressed portion and the opening pattern form a substantially closed area.

6. The LCD of claim 5, further comprising:
a liquid crystal layer sandwiched between the first substrate and the second substrate, the liquid crystal layer having liquid crystal molecules with negative dielectric anisotropy;

a first alignment layer formed on the pixel electrode;

a second alignment layer formed on the common electrodes, wherein the first alignment layer and the second alignment layer align long axes of the liquid crystal molecules perpendicular to the substrates;

a first polarizing plate formed on an outer surface of the first substrate; and a second polarizing plate formed on an outer surface of the second substrate.

7. The LCD of claim 6, wherein the first polarizing plate and the second polarizing plate have polarizing axes perpendicular to each other.

8. The LCD of claim 7, wherein the liquid crystal molecules placed within the closed area defined by the depressed portion and the opening pattern have four average long axial directions.

9. The LCD of claim 8, wherein each of the average long axial directions is slanted at an angle between about 40° and about 50° with respect to the polarizing axes of the first polarizing plate and the second polarizing plate.

10. The LCD of claim 1, wherein the non-depressed portion is formed between black matrixes formed on the second substrate.

* * * * *